Dec. 10, 1940.  K. WILHELM  2,224,207
RECEIVER CIRCUIT ARRANGEMENT
Filed June 2, 1938
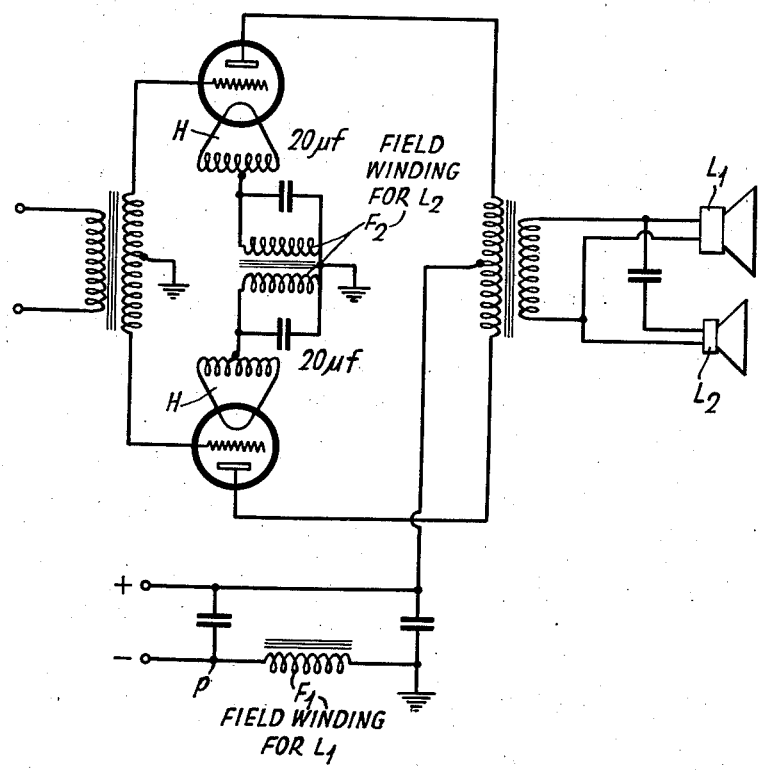
INVENTOR
*KARL WILHELM*
BY *H. S. Srover*
ATTORNEY Patented Dec. 10, 1940

2,224,207

UNITED STATES PATENT OFFICE 2,224,207

RECEIVER CIRCUIT ARRANGEMENT

Karl Wilhelm, Berlin, Germany, assignor to Telefunken Gesellschaft für Drahtlose Telegraphie m. b. H., Berlin, Germany, a corporation of Germany Application June 2, 1938, Serial No. 211,328
In Germany June 3, 1937

1 Claim. (Cl. 250—27)

It is known that the field winding of a dynamic loudspeaker may be used to serve as the low-pass coil comprised in the power pack of a receiver or amplifier. In all cases where the D. C. fall of potential across this field winding was to be used as the grid biasing potential, it was placed in the negative lead.

Modern receiver sets are also provided with a so-called tweeter loudspeaker. The field winding of such a loudspeaker could be connected, for instance, in series with the field winding of the loudspeaker taking care of the lower tonal ranges or pitches. However, this would raise the power that has to be provided.

Now, according to the invention this extra amount of energy is saved in that, if the field winding of the loudspeaker for the low pitches serves as a low-pass coil, the field winding of the tweeter loudspeaker is used as the cathode series resistance for the grid biasing potential, especially the triode power stage. The requirements of exciting power for the tweeter loudspeaker, as is to be noted, is lower than for the other loudspeaker so that the power consumed in the cathode resistance of a tube carrying a heavy plate current will suffice. This holds true particularly of triode tubes because these require a higher biasing voltage than for example the screen-grid type of tube.

In the drawing there is shown an exemplified embodiment of the invention. The low-pitch loudspeaker $L_1$ and the high-pitch loudspeaker or tweeter loudspeaker $L_2$ are fed from a push-pull power stage. The exciting winding $F_1$ of the former loudspeaker $L_1$ serves as a filter choke. If desired, a negative biasing voltage may be taken off terminal P.

The field winding of the tweeter loudspeaker $L_2$ is here split in order that the two parts may serve as separate cathode resistances for the push-pull stage. The use of distinct cathode resistances in a push-pull stage is fundamentally known in the art. The parts of the field winding $F_2$ are bridged by large condensers ($20\mu$ F, for example), inasmuch as only the D. C. drop across the windings is to be used as a grid biasing voltage. Since this exemplified embodiment contains directly heated tubes, the field windings are united with the midpoints of the heating windings H of the supply-line transformer.

The invention affords a particularly high utilization of the available energy for the feeding of the field windings of the loudspeakers.

What I claim is:

In a radio receiver, a pair of audio amplifier tubes arranged in push-pull and each including an anode, a control grid and a cathode, a high frequency loudspeaker and a low frequency loudspeaker both fed from said push-pull amplifier tubes, a source of power supply for said amplifier tubes including a filter choke, said choke mounted on a core serving as the sole direct current energizing means for the low frequency loudspeaker, and a pair of choke coils mounted on a second core, each common to one of the grid to cathode and plate to cathode circuits of the push-pull amplifier tubes, whereby each of said choke coils serves to bias its respective grid negatively, said pair of choke coils also serving as the sole direct current energizing means for the high frequency loudspeaker.

KARL WILHELM.